United States Patent [19]
Hutchings

[11] Patent Number: 4,790,950
[45] Date of Patent: Dec. 13, 1988

[54] AQUEOUS ALKALI METAL HALOGENITE COMPOSITIONS CONTAINING A COLORANT STABILIZED BY $NH_4OH$

[75] Inventor: Richard S. Hutchings, Cincinnati, Ohio

[73] Assignee: The Drackett Company, Cincinnati, Ohio

[21] Appl. No.: 165,046

[22] Filed: Mar. 7, 1988

[51] Int. Cl.[4] .......... A01N 59/00; C11D 3/48; C11D 7/10; D06L 3/08

[52] U.S. Cl. .......... 252/102; 8/108.1; 252/103; 252/187.2; 252/187.21; 252/187.23; 252/397; 424/149

[58] Field of Search .......... 252/98, 102, 103, 187.2, 252/187.21, 187.23, 397; 8/108.1; 424/149

[56] References Cited

U.S. PATENT DOCUMENTS

| | | | |
|---|---|---|---|
| 2,253,368 | 8/1941 | Dubeau | 8/108.1 |
| 2,810,717 | 10/1957 | Lamborn | 252/187.23 |
| 2,947,700 | 8/1960 | Waibel | 252/102 |
| 3,065,040 | 11/1962 | Waibel | 8/108.1 |
| 3,120,424 | 2/1964 | Ruedi | 8/108.1 |
| 3,580,851 | 5/1971 | Heid | 252/99 |
| 3,790,343 | 2/1974 | Ikeda | 8/108.1 |
| 3,836,475 | 9/1974 | Kirner | 8/108.1 |
| 4,084,747 | 4/1978 | Alliger | 424/149 |
| 4,104,190 | 8/1978 | Hartshorn | 252/187.21 |
| 4,141,685 | 2/1979 | Balland | 8/110 |
| 4,330,531 | 5/1982 | Alliger | 424/149 |
| 4,332,691 | 6/1982 | Beavan | 252/96 |
| 4,574,084 | 3/1986 | Berger | 424/128 |
| 4,585,482 | 4/1986 | Tice | 106/15.05 |
| 4,690,772 | 9/1987 | Tell | 252/106 |
| 4,731,192 | 3/1988 | Kenjo | 252/95 |
| 4,731,193 | 3/1988 | Mason | 252/95 |

FOREIGN PATENT DOCUMENTS

| | | |
|---|---|---|
| 1521723 | 7/1970 | Fed. Rep. of Germany . |
| 4636971 | 10/1978 | Japan . |
| 56-67378 | 6/1981 | Japan . |
| 60-13748 | 1/1985 | Japan . |
| 61-181468 | 8/1986 | Japan . |
| 992954 | 5/1965 | United Kingdom . |

*Primary Examiner*—Dennis Albrecht
*Attorney, Agent, or Firm*—Charles J. Zeller

[57] ABSTRACT

Aqueous cleaner compositions containing an alkali metal halogenite, for example, $NaClO_2$; a stabilizable colorant; and a stabilizing amount of a stabilizer compound which is an ammonium hydroxide. The preferred embodiment further includes an anionic or anionic fluorocarbon surfactant.

20 Claims, No Drawings

AQUEOUS ALKALI METAL HALOGENITE COMPOSITIONS CONTAINING A COLORANT STABILIZED BY $NH_4OH$

FIELD OF INVENTION

The present invention relates to aqueous, alkaline cleaner compositions containing an alkali metal halogenite, for example, sodium chlorite, $NaClO_2$, and a stabilizable colorant normally incompatible with said halogenite in aqueous media, the colorant being compatible therewith in view of the inclusion within said composition of a stabilizing amount of a stabilizer which is ammoniu hydroxide.

BACKGROUND OF INVENTION

Aqueous alkali metal halogenite compositions are well known for use in the textile industry wherein the halogenite, especially sodium chlorite, is a source of chlorine dioxide gas, a strong bleachant. Below about pH 9.0, there is a sufficient concentration of $H^+$ ions to commence conversion of the chlorite ion to chlorine dioxide, especially at elevated temperatures. As the concentration of chlorine dioxide in the aqueous solution increases, aqueous alkali metal halogenite compositions become more acidic and the rate of conversion increases.

In the paper industry, sodium chlorite has been used to prevent mold and slime growth in paper mill "white" water, as disclosed in U.S. Pat. No. 3,046,185 to Buonanno.

Applicant has found that alkali metal halogenite solutions, especially sodium chlorite solutions, are suitable for use in household and janitorial cleaning chores, for example, cleaning of tiles, porcelain surfaces, and drains.

For such compositions, especially for compositions for household use, the inclusion of a colorant is preferred. The colorant provides a pleasing hue to the consumer, and makes the composition visible when applied to the work surface being cleaned. In some instances the colorant is an indicator that the product composition has been exhausted.

It has been observed, however, that many colorants, including those often used in household cleaning products, are not stable in the alkali metal halogenite compositions herein disclosed. Instability of the colorant is manifest by the formation of chlorine dioxide gas within the composition, by loss of tinctorial value of the colorant, and lowering of composition pH. Concomitant with the production of chlorine dioxide is the loss of the alkali metal halogenite. Moreover, chlorine dioxide odor is unpleasant and is detectable by the user of the composition when present even in trace concentrations.

It has been found that for many colorants that are otherwise unstable in aqueous alkali metal halogenite compositions, inclusion can be successfully achieved by successfully stabilizing the system with ammonium hydroxide.

Accordingly, it is an object of the present invention to provide a cleaning composition comprising an aqueous alkali metal halogenite solution containing therein a colorant that retains its tinctorial value.

It is a further and primary object of the present invention to provide such compositions wherein the included colorant does not react appreciably with the sodium chlorite to release in excess of trace amounts of chlorine dioxide gas, at the pH of the composition.

These and other objects and advantages of the present invention will be more readily understood upon reading the detailed disclosure of the invention, a summary of which follows.

SUMMARY OF INVENTION

The aqueous, alkaline compositions of the present invention comprise an alkali metal halogenite, for example, sodium chlorite, $NaClO_2$; a stabilizable colorant that is normally chemically incompatible with the halogenite in aqueous media, and a stabilizer present in the composition in an amount effective to stabilize not only the colorant but also the composition, as evidenced by the substantial absence of chlorine dioxide in the composition. The stabilizer is ammonium hydroxide.

Optionally, a surfactant may be included in the composition to provide detergency thereto and to enhance its cleaning efficacy.

The alkali metal halogenite is typically present in an amount of about 5% or less by weight of the composition, sodium chlorite being the preferred species thereof. The colorant is selected from the group consisting of dyes, lakes, and pigments, dyes being preferred in view of their greater water solubility, the colorant generally being present in an amount of from about 0.01 to about 3% (active colorant basis), preferably from about 0.1 to about 2%, by weight of the composition.

The stabilizer is present in an amount effective to prevent interaction of the colorant with halogenite ions formed by dissociation of the alkali metal halogenite in aqueous media. Preferably, the stabilizer is present in an amount of from 0.5 to about 3% by weight of the composition.

Many otherwise unstable colorants may be stabilized by the practice of the present invention. It has been found, however, that for some colorants better stability is obtained if the colorant is first treated by neutralizing the colorant with base, to remove potential reaction sites or acidic contaminants from the colorant.

The stable compositions of the present invention are alkaline, with stability increasing generally with increasing pH. For best stabilization the compositions exhibit a pH of about 9 and above, preferably from about 9.0 to about 10.5.

It has additionally been found that stability of the composition is further enhanced when the composition contains an anionic surfactant. Conversely, it has been found that the presence of a nonionic surfactant reduces stability, although stability is superior in such nonionic surfactant-containing compositions incorporating the stabilizer constituent in effective amount than without same, in the presence of the colorant.

Preferred colorants are Colour Index Dye Nos. 42,090 and 52,035.

DETAILED DESCRIPTION OF THE INVENTION AND PRFERRED EMBODIMENT

In attempting to prepare aqueous cleaning compositions comprising sodium chlorite and including a colorant, it was found that the resulting compositions contained generally unacceptable amounts of chlorine dioxide gas. Such chlorine dioxide gas is unacceptable because of its unpleasant odor. Further, dye contained in the composition was depleted, resulting in loss of tinctorial value.

What was surprising about the formation of the chlorine dioxide in compositions containing the sodium chlorite and the colorant, typically a dye, is that it occurred in compositions having an initial pH of 9 and above, such compositions generally being regarded as unable to form chlorine dioxide. Such appearance of chlorine dioxide occurred even when the colorant under investigation was neutralized with base.

It is believed that the interaction between the colorant and the sodium chlorite was not a conventional acid-based neutralization reaction, as in the case of, say, hydrochloric acid and sodium hydroxide. Rather, it is believed that a chromophore site on the colorant molecule is conducive for converting the chlorite ion, $ClO_2^-$, to chlorine dioxide and $H^+$ ions, the chlorine dioxide and the $H^+$ ions then participating in the conversion of additional chlorite ion to chlorine dioxide. In any event, as the concentration of chlorine dioxide increased, a resulting decrease in system pH was observed, the system pH falling to below 7.0 at completion. The rate of chlorine dioxide formation accelerated as system pH decreased towards the acid range.

Various materials were used in trying to prevent the chlorine dioxide from forming in the aforementioned sodium chlorite-colorant systems. It was found that the inclusion of ammonium hydroxide greatly improved the stability of the composition, while alkali metal salts of $HCO_3^-$, $CH_2COO^-$, $SO_4^=$ and $M_oO_4^=$ were unsuitable, surprising in view of their use as buffers at the pH 8 to 10 range. Also unsuitable was a mixture of $NH_4OH$ and NaCl in compositions having a pH of 13.

Accordingly, the compositions of the present invention are aqueous, alkaline cleaning compositions comprising on a weight basis about 5% or less of an alkali metal halogenite, from about 0.01 to about 3% on an active basis of a stabilizable colorant selected from the group consisting of dyes, lakes, and pigments, said colorant normally chemically incompatible with said halogenite in aqueous, alkaline media, and an ammonium hydroxide stabilizer, said stabilizer being present in the composition in an amount effective to stabilize the composition as evidenced by a substantial absence of chlorine dioxide therein.

By the practice of the present invention, sodium chlorite compositions containing the otherwise incompatible colorant, which compositions do not produce in excess of a trace concentration of chlorine dioxide within about one month of preparation, preferably three months, most preferably six months, can be made. By trace concentration is meant a level of chlorine dioxide detectable by conventional analytical means and/or by olefactory sensory evaluation, usually less than about 5 ppm, preferably less than about 1 ppm, in said composition.

Sodium chlorite is preferably present in an amount of from about 0.5 to about 5%, most preferably from about 1 to about 3%, by weight of the composition. Above about 5% of the chlorite generally provides a composition having too high an ionic strength for successful stabilization, although with proper selection of dye, stabilizer, and optionally anionic surfactant, higher sodium chlorite levels may be suitable.

The incompatible colorants include many different classes of colorants. Thus, it has been found that of the dyes, stable compositions have been obtained in accordance with the present invention with Acid Blue 185 (Cibacrolin Blue 8G), and Colour Index Dye Nos. 22,610 (Direct Blue 6), 42,090 (Hidacid Azure Blue), 52035 (Hidacid Aqua Blue), and 74,180 (Direct Blue 86), which includes phthalocyanine, diazo, thiazine, and triarylmethane dyes. With regard to colorants not specifically referred to herein, stabilization potential both may easily be ascertained by routine experimentation, as described in greater detail in the examples below.

In general, it is preferred that the composition pH have a value of about 9 and above, preferably between about 9.0 and 10.5. At such pH level, each of the aforementioned dyes are stable in said compositions and said compositions are stable, chlorine dioxide not being released.

In order to ensure that the compositions of the present invention are initially stable and that stability is maintained for reasonably long time periods, it is preferred to prepare an aqueous premix composition containing the chlorite and the stabilizer and to thereafter incorporate the dye component.

The compositions of the present invention may also include a surfactant, to improve detergency and enhance cleaning efficacy. It has been found that many of the common classes of anionic surfactants are stable in the subject composition, and that the composition remains stable when said effective amount of the stabilizer has been incorporated to stabilize the colorant.

Broadly, the anionic surfactants are water-soluble alkyl or alkylaryl compounds, the alkyl having from about 8 to about 22 carbons, including a sulfate or sulfonate substituent group that has been base-neutralized, typically to provide an alkali metal, e.g., sodium or potassium, or an ammonium anion, including, for example: (1) alkyl and alkylaryl sulfates and sulfonates having preferably 10 to 18 carbons in the alkyl group, which may be straight or branched chain, e.g., sodium lauryl sulfate and sodium dodecylbenzene sulfonate; (2) alpha-olefin aryl sulfonates preferably having from about 10 to 18 carbons in the olefin, e.g., sodium $C_{14-16}$ olefin sulfonate, which is a mixture of long-chain sulfonate salts prepared by sulfonation of $C_{14-16}$ alpha-olefins and chiefly comprising sodium alkene sulfonates and sodium hydroxyalkane sulfonates; (3) sulfated and sulfonated monoglycerides, especially those derived from coconut oil fatty acids; (4) sulfate ethers of ethoxylated fatty alcohols having 1–10 mols ethylene oxide, e.g., sodium polyoxyethylene (7 mol EO) lauryl ether sulfate, and sulfate ethers of ethoxylated alkyl phenols having 1-10 mols ethylene oxide and 8 to 12 carbons in the alkyl, e.g., ammonium polyoxyethylene (4 mol EO) nonyl phenol ether sulfate; (5) base-neutralized esters of fatty acids and isethionic acid, e.g., sodium lauroyl isethionate; (6) fatty acid amides of a methyl tauride, e.g., sodium methyl cocoyl taurate, (7) beta-acetoxy- or beta-acetamido-alkane sulfonates where the alkane has from 8 to 22 carbons, and (8) acyl sarcosinates having 8 to 18 carbons in the acyl moiety, e.g., sodium lauroyl sarcosinate.

Preferred anionics are the alkyl and alkylaryl sulfates and the alpha-olefin aryl sulfonates.

The anionic surfactants may be included in an amount of from 0 to about 20%, preferably from about 0.5 to about 10%, most preferably from about 2 to about 8%, by weight of the composition.

It has been found that the anionic surfactants have a further stabilizing effect on compositions containing the chlorite, colorant, and stabilizer agents, the rate of chlorine dioxide formation being less when the anionic surfactant is included than when it is omitted. It is believed that this further stabilization is attributable to micellular interaction between the colorant and the surfactant anion.

It has been found that anionic fluorocarbon surfactants have the same stability enhancement benefit as the anionic surfacttants, in the compositions of the present invention, but at a much reduced concentration level. Examples of suitable anionic fluorosurfactants are the Zonyl series manufctured by E.I. duPont de Nemours and Co., especially Zonyls FSA; FSJ and RP, and the Flourad series manufactured by 3M Company, especially Flourads 120 and 128. A further general discussion of fluorosurfactants is provided in U.S. Pat. No. 4,511,489 to Requejo et al., incorporated herein by reference thereto.

The flourocarbon surfactants are includable in the compositions of the present invention in an amount of up to about 1%, preferably from about 0.005 to about 0.1%, by weight of the composition. Mixtures of anionic and anionic fluorocarbon surfactants may be included in the compositions of the present invention.

Nonionic surfactants might also be included in the compositions of the present invention. The presence of the stabilizer provides a stabilizing benefit to such nonionic surfactant-containing solutions. Although greater stability is shown of such compositions as compared to compositions containing the nonionic surfactant and the colorant but without the stabilizer, the stability of the compositions of the present invention is generally lessened by the inclusion of the nonionic surfactant. For this reason, it is preferred not to include them, although they may be includable in an amount of less than about 3%, preferably less than 1%, by weight of the composition. Accordingly, adjuvants may be incorporated wherein the adjuvant is solubilized by minor amounts of a nonionic surfactant. The stability of compositions containing both an anionic and a nonionic surfactant is relatively proportional to the concentrations of each therein.

Cationic surfactants may also be included herein, although should not be included with compositions containing the anionic surfactant in view of their inherent incompatibility. Similarly, quaternary surfactants may be included. The cationic and quaternary surfactants generally would be included in low amounts, to achieve a particular activity. For example, these surfactants are known germicides.

Optionally, other adjuvants may be included in the compositions of the present invention, provided that such included adjuvants do not exhibit incompatibility. For example, perfumes, chelating agents, sequestering agents, builders, and the like, may be included. With regard to perfumes, in view of the presence of substituent groups reactive with the chlorite ion, care must be taken to properly screen the perfume used.

The present invention is illustrated by the examples below.

General

In the examples, a sample composition was deemed stable if chlorine dioxide gas is not formed within about one month of sample preparation and the dye half-life was about two weeks or longer.

In some instances, chlorine dioxide gas is easily detected by its characteristic odor. Where such sensory evaluations did not indicate the presence of $ClO_2$, one of several analytical methods were used: (1) spectrophotometric measurement of a sample, chlorine dioxide having a peak absorbance of 356 mm, unique among the oxychloro species; (2) titration of an alkaline sample with sodium thiosulfate in the presence of potassium iodide, and (3) purging $ClO_2$ (g) from the sample with inert gas and passing the purge gas through a potassium iodide solution.

For samples not forming $ClO_2$ (g), dye concentration may be measured by spectrophotometric measurement of the characteristic absorbanc peak for the dye.

In the examples all concentrations are reported on an active-ingredient basis, unless otherwise indicated.

EXAMPLE 1

The following compositions were prepared containing 1.6% sodium chlorite, dye as indicated and water.

TABLE I

| Composition | Dye | Wt. % Dye |
|---|---|---|
| 1-A | Acid Blue No. 9 | 0.67 |
| 1-B | Hidacid Aqua Blue | 1.0 |
| 1-C | Pyrazole FT GLL - 120% | 1.0 |
| 1-D | Hidacid Green | 0.99 |

Examples A-D produced chlorine dioxide gas within 24 hours of sample preparation. Where necessary, the initial pH of a sample was adjusted to a value of 10 with NaOH, which proved ineffective to prevent chlorine dioxide formation.

EXAMPLE 2

The following compositions were prepared.

TABLE II

| Constituents | Concentration, Wt. % 2-A | 2-B |
|---|---|---|
| Sodium Chlorite | 1.6 | 0.8 |
| Ammonium hydroxide | 0.8 | 0.8 |
| Perfume | — | 0.1 |
| Nonionic surfactant | — | 2.0 |
| Anionic surfactant | — | 0.02 |
| Dye | Per Table II-A | |
| Water | <<Q.S. 100%>> | |

TABLE II-A

| Composition | Dye | Wt. % Dye |
|---|---|---|
| 2-A-1 | Acid Blue No. 9 | 0.67 |
| 2-A-2 | Hidacid Aqua Blue | 1.0 |
| 2-A-3 | Pyrazole FT GLL - 120% | 1.0 |
| 2-A-4 | Hidacid Green | 0.99 |
| 2-B-1 | Acid Blue No. 9 | 0.67 |
| 2-B-2 | Hidacid Aqua Blue; | 0.45; |
| | Acid Blue No. 9 | 0.33 |
| 2-B-3 | Pyrazole FT GLL - 120% | 1.0 |
| 2-B-4 | Hidacid Green | 0.99 |

None of the samples above produced chlorine dioxide gas after 28 days at 125° F.

EXAMPLE 3

Various ammonium compounds were tested for their ability to stabilize sodium chlorite solutions containing a dye. The base composition contained 0.8% sodium chlorite, 2% Hidacid Blue dye, 0.5% of the ammonium compound as identified below, and water.

TABLE III

| Composition | Ammonium Compound |
|---|---|
| 3-A | Ammonium hydroxide |

TABLE III-continued

| Composition | Ammonium Compound |
|---|---|
| 3-B | Ammonium bicarbonate |
| 3-C | Ammonium chloride |
| 3-D | Ammonium sulfate |
| 3-E | Ammonium molybdate |
| 3-F | Ammonium acetate |

Compositions 3-A and 3-B did not produce chlorine dioxide within six days at 125%. Chlorine dioxide was produced in Compositions 3-C through 3-F after one day at 125° F. Although chlorine dioxide was not detected in Composition 3-B, an analysis indicated that the sodium chlorite had been depleted, and most likely reduced to sodium chloride.

I claim:

1. An aqueous, alkaline cleaning composition comprising on a weight basis about 0.5 to about 5% of an alkali metal halogenite; from about 0.01 to about 3% of a dye normally chemically incompatible with said halogenite in aqueous media, and a stabilizer which is ammonium hydroxide, said stabilizer being present in the composition in an amount effective to stabilize the composition as evidenced by a substantial absence of chlorine dioxide in the composition.

2. The composition of claim 1 wherein the composition has an initial pH of about 9 and above.

3. The composition of claim 2 wherein the dye is selected from the group consisting of phthelocyanine, diazo, thiazine and triarylmethane dyes.

4. The composition of claim 3 wherein the composition has an initial pH of from about 9 to about 10.5.

5. The composition of claim 4 wherein the dye is a triarylmethane dye.

6. The composition of claim 4 wherein the dye is selected from the group consisting of Acid Blue Dye 185 and Colour Index Dye Nos. 22,610; 42,090; 52,035, and 74,180.

7. The composition of claim 4 wherein the dye is Colour Index Dye No. 42,090.

8. The composition of claim 4 wherein the dye is Colour Index Dye No. 52,035.

9. The composition of claim 1 wherein the halogenite is sodium chlorite.

10. The composition of claim 6 wherein the halogenite is sodium chlorite.

11. An aqueous, alkaline cleaning composition comprising on a weight basis from about 0.5 to about 5% sodium chlorite; from about 0.01 to about 3% of a stabilizable dye, said dye being normally chemically incompatible with said sodium chlorite in said aqueous composition, and a stabilizer which is ammonium hydroxide, said stabilizer being present in the composition in an amount effective to stabilize the composition as evidenced by the substantial absence of chlorine dioxide therein and a dye half-life of at least about two weeks.

12. The composition of claim 11 wherein the initial pH of the composition is from about 9.0 to about 10.5, the dye being selected from the group consisting of Acid Blue Dye 185 and Colour Index Dye Nos. 22,610; 42,090; 52,035; and 74,180.

13. The composition of claim 12 wherein the dye is Colour Index Dye No. 42,090.

14. The composition of claim 12 wherein the dye is Colour Index Dye No. 52,035.

15. The composition of claim 11 further comprising an anionic surfactant in an amount of from about 0.02 to about 20%.

16. The composition of claim 11 further comprising an anionic fluorosurfactant in an amount of from about 0.005 to about 1%.

17. The composition of claim 12 wherein the sodium chlorite is present in an amount of from about 1 to about 3%.

18. The composition of claim 17 wherein the dye is present in an amount of from about 0.1 to about 2%.

19. The composition of claim 18 containing from about 0.1 to about 10% of the anionic surfactant.

20. The composition of claim 18 containing from about 0.01 to about 0.1% of the fluorosurfactant.

* * * * *